(12) United States Patent
Kowada

(10) Patent No.: US 8,402,752 B2
(45) Date of Patent: Mar. 26, 2013

(54) INJECTOR MOUNTING STRUCTURE

(75) Inventor: Minoru Kowada, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 101 days.

(21) Appl. No.: 12/676,056

(22) PCT Filed: Mar. 18, 2008

(86) PCT No.: PCT/JP2008/000623
§ 371 (c)(1),
(2), (4) Date: Mar. 2, 2010

(87) PCT Pub. No.: WO2009/031252
PCT Pub. Date: Mar. 12, 2009

(65) Prior Publication Data
US 2010/0186393 A1    Jul. 29, 2010

(30) Foreign Application Priority Data
Sep. 4, 2007  (JP) .................. 2007-228641

(51) Int. Cl.
*F01N 3/24* (2006.01)
(52) U.S. Cl. .................... 60/295; 60/317
(58) Field of Classification Search .............. 60/295, 60/301, 303, 297, 317, 324
See application file for complete search history.

(56) References Cited

U.S. PATENT DOCUMENTS

| | | | |
|---|---|---|---|
| 6,192,677 B1 * | 2/2001 | Tost | 60/286 |
| 6,539,708 B1 | 4/2003 | Hofmann et al. | |
| 2003/0110763 A1 * | 6/2003 | Pawson et al. | 60/286 |
| 2006/0107655 A1 | 5/2006 | Hanitzsch et al. | |
| 2007/0092413 A1 | 4/2007 | Hirata et al. | |
| 2008/0236147 A1 * | 10/2008 | Van Vuuren et al. | 60/295 |

FOREIGN PATENT DOCUMENTS

| | | |
|---|---|---|
| EP | 1 662 108 A1 | 5/2006 |
| GB | 759524 | 10/1956 |
| GB | 2381218 A * | 4/2003 |
| JP | 59 115860 | 8/1984 |
| JP | 2000 170628 | 6/2000 |
| JP | 2005 127318 | 5/2005 |
| JP | 2005 155404 | 6/2005 |
| WO | WO 2005/005799 A1 | 1/2005 |

OTHER PUBLICATIONS

U.S. Appl. No. 12/677,957, filed Mar. 12, 2010, Kowada, et al.
U.S. Appl. No. 12/679,677, filed Mar. 24, 2010, Kowada.
European Search Report issued on May 11, 2011 in the corresponding European Application No. 08 72 0508.
U.S. Appl. No. 12/738,994, filed Apr. 21, 2010, Kowada.
U.S. Appl. No. 12/742,321, filed May 11, 2010, Kowada, et al.

* cited by examiner

*Primary Examiner* — Thomas Denion
*Assistant Examiner* — Jonathan Matthias
(74) *Attorney, Agent, or Firm* — Oblon, Spivak, McClelland, Maier & Neustadt, L.L.P.

(57) ABSTRACT

The present invention has its object to suppress heat transfer from an adapter 19 to an injector 11 so as to ensure a high level of reliability of the injector 11 over a long time. In a mounting structure for an injector 11 fitted at a mixing pipe 9B (exhaust passage) via an adapter 19 for addition of urea water into exhaust gas 3, an inner surface of the adapter 19 to be exposed to the flow of the exhaust gas 3 is shielded by a heat-resisting plate 22 to interpose a heat insulating layer 23 between the plate 22 and the inner surface.

11 Claims, 5 Drawing Sheets

INJECTOR MOUNTING STRUCTURE

TECHNICAL FIELD

The present invention relates to an injector mounting structure for an injector which adds urea water as reducing agent so as to reduce and depurate $NO_x$ upstream of a selective reduction catalyst.

BACKGROUND ART

It has been recently proposed that a particulate filter for capturing particulates in exhaust gas is incorporated in an exhaust pipe and a selective reduction catalyst capable of selectively reacting $NO_x$ with ammonia even in the presence of oxygen is arranged downstream of the particulate filter, urea water as reducing agent being added between the selective reduction catalyst and the particulate filter, thereby attaining reduction of both the particulates and $NO_x$.

Such addition of the urea water to the selective reduction catalyst is conducted between the particulate filter and the selective reduction catalyst. Thus, in order to ensure sufficient reaction time for pyrolysis of the urea water added to the exhaust gas into ammonia and carbon dioxide gas, it is necessary to prolong a distance between a urea water added position and the selective reduction catalyst. However, such arrangement of the particulate filter and the selective reduction catalyst substantially spaced apart from each other will extremely impair the mountability on a vehicle.

In order to overcome this, a compact exhaust emission control device as shown in FIGS. 1 and 2 has been proposed by the inventor as Japanese patent application No. 2007-29923. In the exhaust emission control device of the prior application shown, incorporated in an exhaust pipe 4 through which exhaust gas 3 flows from a diesel engine 1 via an exhaust manifold 2 is a particulate filter 5 housed in a casing 7 to capture particles in the exhaust gas 3; arranged downstream of and in parallel with the particulate filter 5 and housed in a casing 8 is a selective reduction catalyst 6 having a property capable of selectively reacting $NO_x$ with ammonia even in the presence of oxygen. An exit-side end of the particulate filter 5 is connected to an entry-side end of the selective reduction catalyst 6 through an S-shaped communication passage 9 such that the exhaust gas 3 discharged through the exit-side end of the particulate filter 5 is reversely curved back into the entry-side end of the adjacent selective reduction catalyst 6.

As shown in FIG. 2 which shows substantial parts in enlarged scale, the communication passage 9 is the S-shaped structure comprising a gas gathering chamber 9A which encircles the exit-side end of the particulate filter 5 to gather the exhaust gas 3 through substantially perpendicular turnabout of the gas just discharged from the exit-side end of the particulate filter 5, a mixing pipe 9B which extracts the gathered exhaust gas 3 from the chamber 9A in a direction reverse to that of the exhaust gas flow in the filter 5 and which is provided with an injector 11 for urea water addition (urea water addition means) intermediately of the mixing pipe and a gas dispersing chamber 9C which encircles the entry-side end of the selective reduction catalyst 6 so as to disperse the gas 3 guided by the mixing pipe 9B through substantially perpendicular turnabout into the entry-side end of the selective reduction catalyst 6.

Arranged in the casing 7 and in front of the particulate filter 5 is an oxidation catalyst 14 for oxidization treatment of unburned fuel in the exhaust gas 3. Arranged in the casing 8 and behind the selective reduction catalyst 6 is an ammonia reducing catalyst 15 for oxidization treatment of surplus ammonia.

With the exhaust emission control device thus constructed, particulates in the exhaust gas 3 are captured by the particulate filter 5. The urea water is added intermediately of the mixing pipe 9B and downstream of the filter into the exhaust gas 3 by the injector 11 and is pyrolyzed into ammonia and carbon dioxide gas, so that $NO_x$ in the exhaust gas 3 is satisfactorily reduced and depurated by the ammonia on the selective reduction catalyst 6. As a result, both the particulates and $NO_x$, in the exhaust gas 3 are reduced.

In this case, the exhaust gas 3 discharged from the exit-side end of the particulate filter 5 is reversely curved back by the communication passage 9 into the entry-side end of the adjacent selective reduction catalyst 6. As a result, enough reaction time is ensured for production of ammonia from the urea water since a long distance between the urea water added position intermediately of the communication passage 9 and the selective reduction catalyst 6 is ensured and the flow of the exhaust gas 3 becomes turbulent due to the reversed curving to facilitate mixing of the urea water with the exhaust gas 3.

Moreover, the particulate filter 5 and selective reduction catalyst 6 are arranged in parallel with each other and the communication passage 9 is arranged between and along the particulate filter 5 and selective reduction catalyst 6, so that the whole structure becomes compact in size to substantially improve its mountability on a vehicle.

However, as illustrated in FIGS. 1 and 2, addition of the urea water to the selective reduction catalyst 6 at between the particulate filter 5 and the selective reduction catalyst 6 is conducted in such a manner that a boss 10 is provided intermediately of and branched obliquely from the mixing pipe 9B to be directed upstream, the injector 11 for addition of urea water being fitted into the boss 10 from outside of the mixing pipe 9B, urea water being added with the injector 11 being protected so as not to be directly exposed to the flow of the hot exhaust gas 3. Thus, when the flow rate of the exhaust gas 3 is increased as shown in FIG. 3, the energetic flow of the exhaust gas 3 may urge the urea water added through the injector 11 to be biased against and along an inner wall of the mixing pipe 9B, resulting in failure of satisfactorily dispersion of the urea water.

In order to overcome this, the inventor came to devise out that, as shown in FIGS. 4 and 5, a downstream end 9a of the gas gathering chamber 9A is changed in its connection with the entry-side end of the mixing pipe 9B to surround the latter in a properly spaced manner with an open edge of the entry-side end being closed. The entry-side end of the mixing pipe 9B is formed with first and second openings 12 and 13 and is provided with first, second and third partitions 16, 17 and 18, so that the exhaust gas 3 from the particulate filter 5 swirls in one direction around the entry-side end of the mixing pipe 9B and guided tangentially into the same through the first and second openings 12 and 13; the injector 11 is fitted at and axially of the entry-side end of the mixing pipe 9B for addition of the urea water by the injector 11 axially of the entry-side end of the mixing pipe 9B (this application has been filed and allotted Japanese patent application No. 2007-56963).

It is contemplated that, with such construction, swirling flow is effectively formed in the mixing pipe B by inflow of the exhaust gas 3 through the first and second openings 12 and 13; the urea water is added by the injector 11 axially into the entry-side end of the mixing pipe 9B where the swirling flow is most energetic, so that the added urea water is satisfactorily dispersed into the exhaust gas 3 by the swirling flow to substantially enhance the mixing with the exhaust gas 3.

As a prior art literature pertinent to the invention, there exists, for example, the following Patent Literature 1.
[Patent Literature 1] JP 2005-155404A

SUMMARY OF INVENTION

Technical Problems

As a specific construction for fitting the injector 11 axially of the entry-side end of the mixing pipe 9B as mentioned in the above, it may be contemplated that the opening edge of the entry-side end of the mixing pipe 9B is closed by an adapter to which the injector 11 is bolted. In contrast with a case where the injector 11 is arranged in an offset or deviated manner intermediately of the mixing pipe 9B through the boss 10 as shown in FIGS. 2 and 3, the adapter is directly exposed to the flow of the exhaust gas 3 and has increased thermal load, which may impair reliability of the injector 11 due to overheat.

Especially when the particulate filter 5 is arranged upstream as shown, regeneration of the filter 5 is attained in such a manner that fuel is added to the exhaust gas 3 by the diesel engine 1 through, for example, post injection, the added fuel (HC) undergoing oxidation reaction on the upstream-side oxidation catalyst 14, the exhaust temperature being elevated by the reaction heat to increase the catalyst floor temperature of the particulate filter 5 to thereby burn out any captured particulates. It is, therefore, contemplated that the thermal load received by the downstream-side adapter upon the regeneration is extremely high.

The invention was made in view of the above and has its object to suppress heat transfer from an adapter to an injector so as to make it possible to favorably ensure the reliability of the injector for a long time.

Solution to Problems

The invention is directed to an injector mounting structure, the injector being incorporated in an exhaust passage through an adapter so as to add urea water to exhaust gas, characterized in that an inner surface of said adapter to be exposed to the exhaust gas flow is shielded by a heat-resisting plate to interpose a heat insulating layer between said plate and said inner surface.

Thus, the inner surface of the adapter to be exposed to the flow of the exhaust gas is shielded by the heat-resisting plate and heat transfer from the adapter to the injector is significantly suppressed by the heat insulating layer interposed between the plate and the inner surface of the adapter, so that the injector is prevented from being damaged due to overheat.

In the invention, it is preferable that parts for fastening the adapter and the injector together are air-tightly shielded by the plate, which brings about suppression of heat transfer to the fastening parts for the adapter and injector and which also causes the plate to serve as gas seal for the fastening parts.

Advantageous Effects of Invention

An injector mounting structure according to the invention as mentioned in the above can bring about various meritorious effects as mentioned in the below.
(I) The inner surface of the adapter to be exposed to the exhaust gas flow is shielded by the heat-resisting plate to interpose the heat insulating layer between the plate and the inner surface, so that heat transfer from the adapter to the injector can be significantly suppressed to prevent the injector from being damaged due to overheat. As a result, reliability of the injector can be satisfactorily ensured for a long time.
(II) When the parts for fastening the adapter and the injector together are air-tightly shielded by the plate, heat transfer to the fastening parts for the adapter and the injector can be suppressed and the plate can also serve as gas seal for the fastening parts. As a result, the fastening parts can be protected against heat from the exhaust gas and corrosive components and therefore can be prevented from being damaged due to seizure, high-temperature oxidation and the like.

Figure 1:
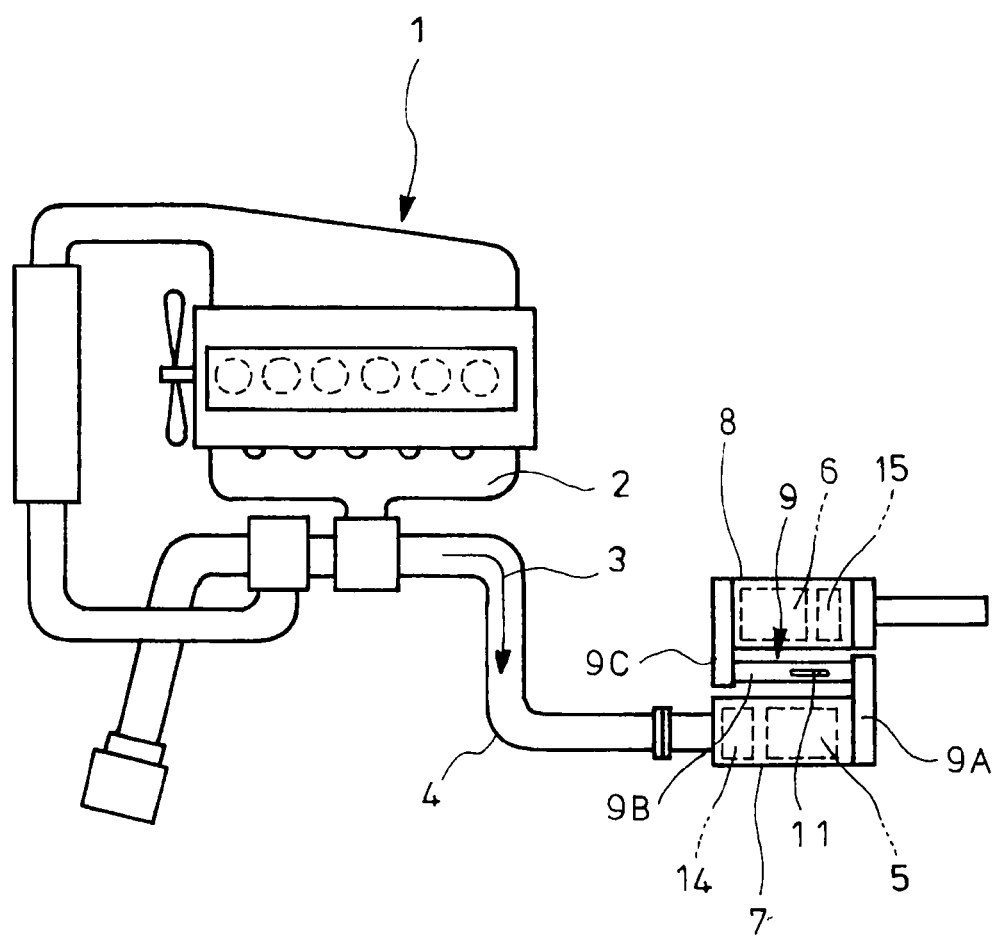
FIG. 1 is a schematic view showing an example of a newly devised exhaust emission control device which is compact in size.
Figure 2:
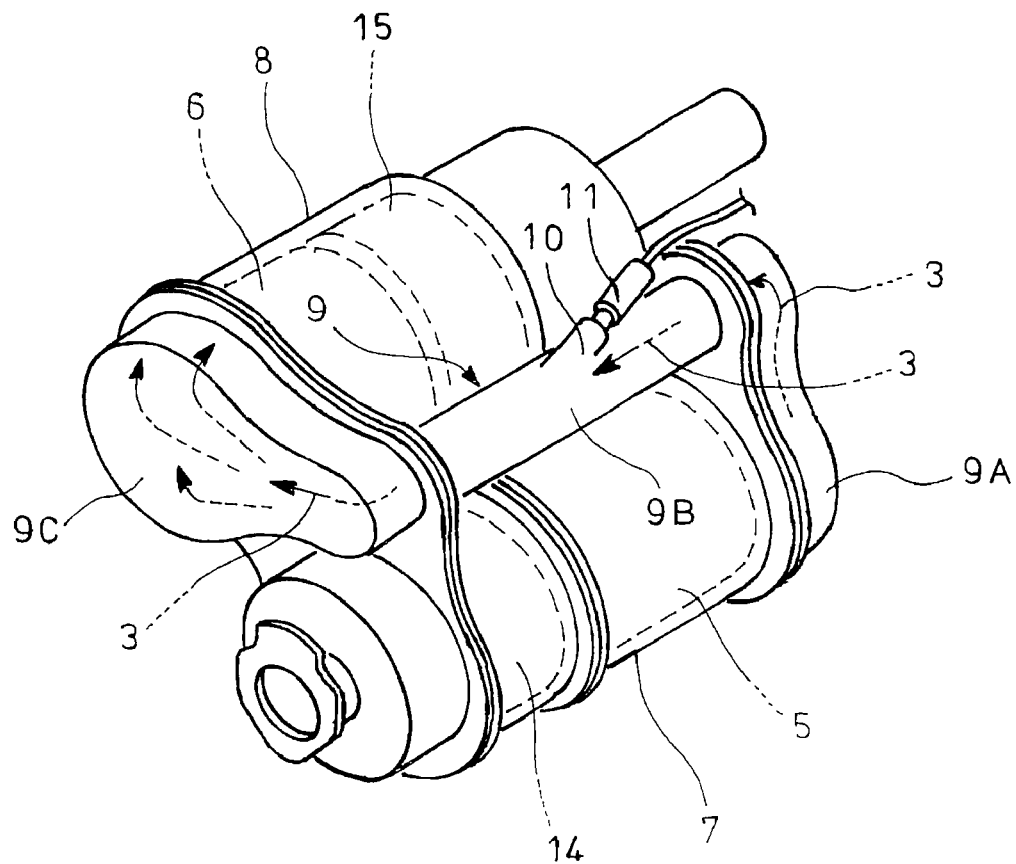
FIG. 2 is a perspective view showing substantial parts in FIG. 1 in enlarged scale.
Figure 3:
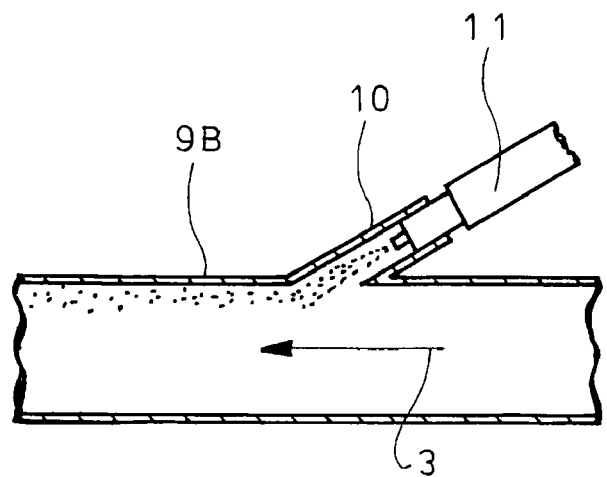
FIG. 3 is a sectional view of the injector mounting structure shown in FIG. 2.

REFERENCE SIGNS LIST 3 exhaust gas
9B mixing pipe (exhaust passage)
11 injector for urea water addition
19 adapter
20 stud bolt (fastening part)
21 nut (fastening part)
22 plate
23 heat insulating layer

DESCRIPTION OF EMBODIMENT

An embodiment of the invention will be described in conjunction with the drawing.

Figure 4:
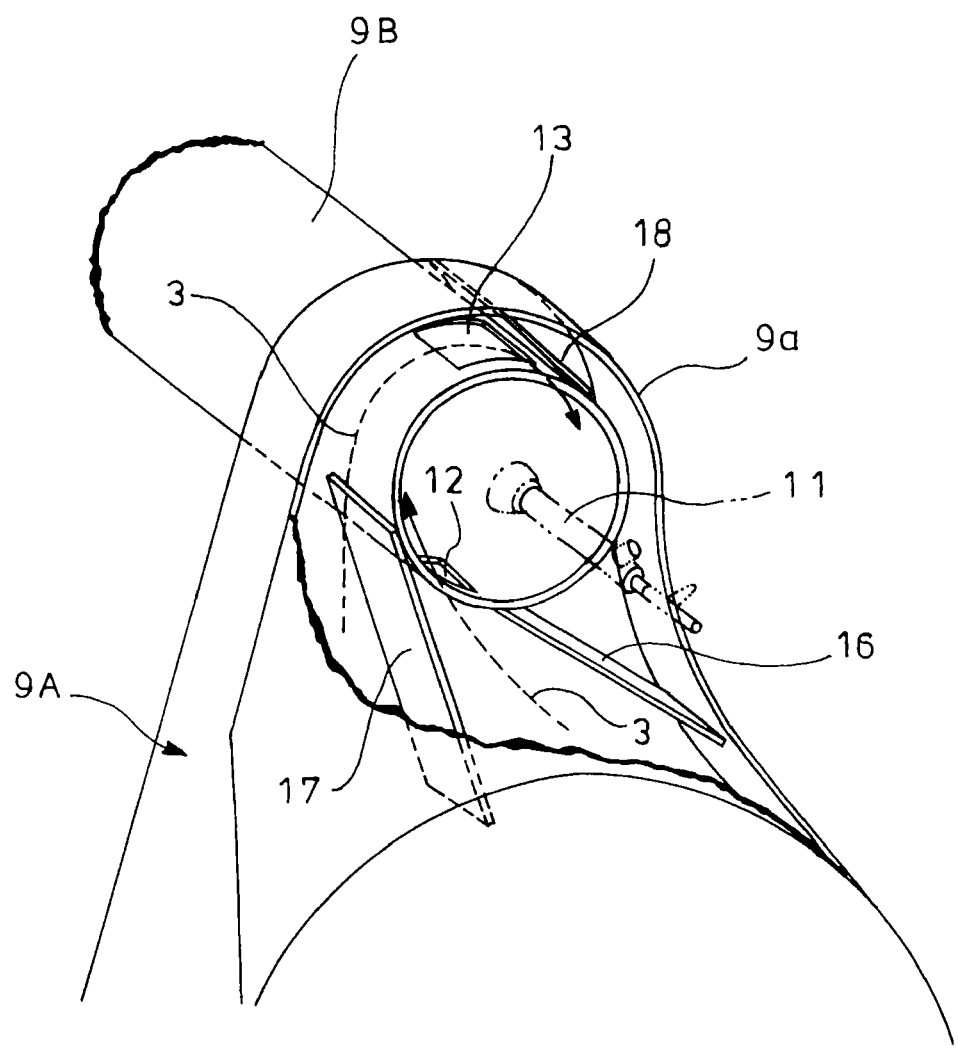
FIG. 4 is a perspective view showing partly in cutout another example of injector mounting structure.
Figure 5:
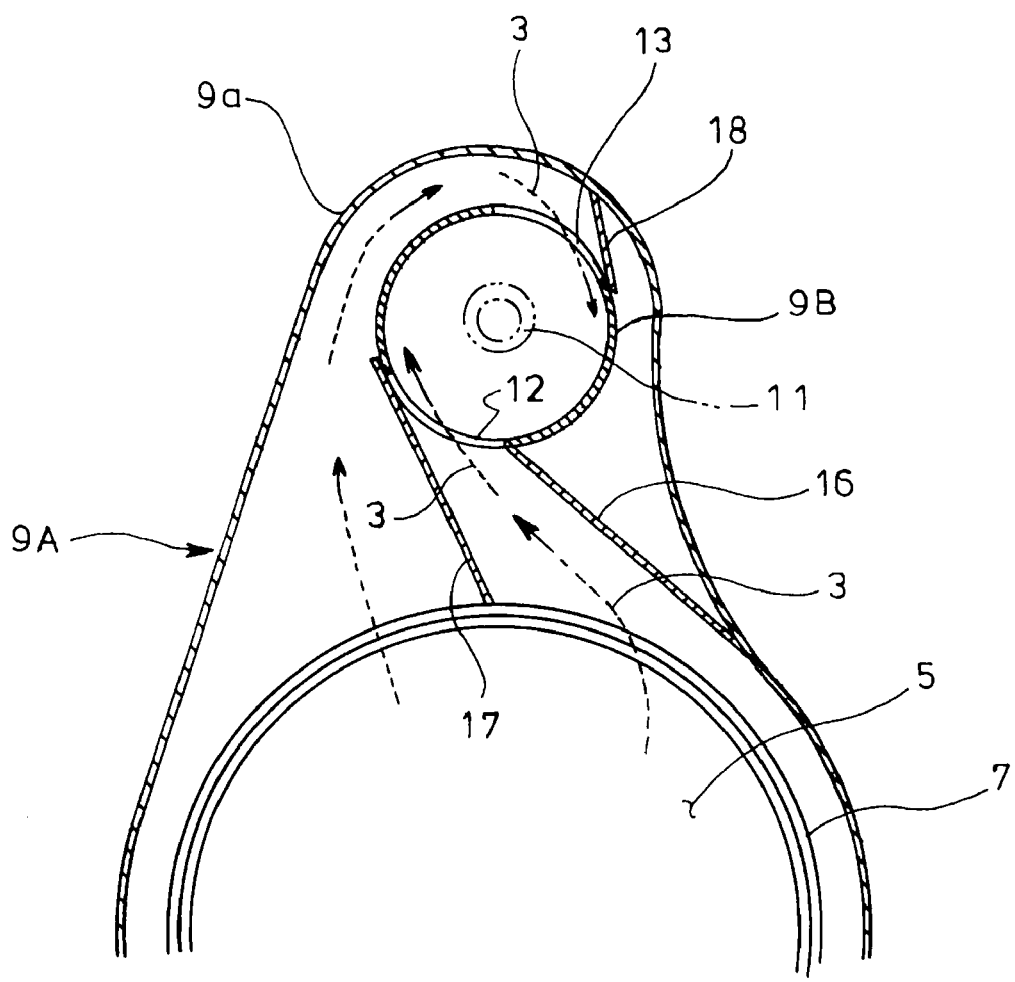
FIG. 5 is a sectional view looking FIG. 4 in a direction opposing to the entry-side end of the mixing pipe.
Figure 6:
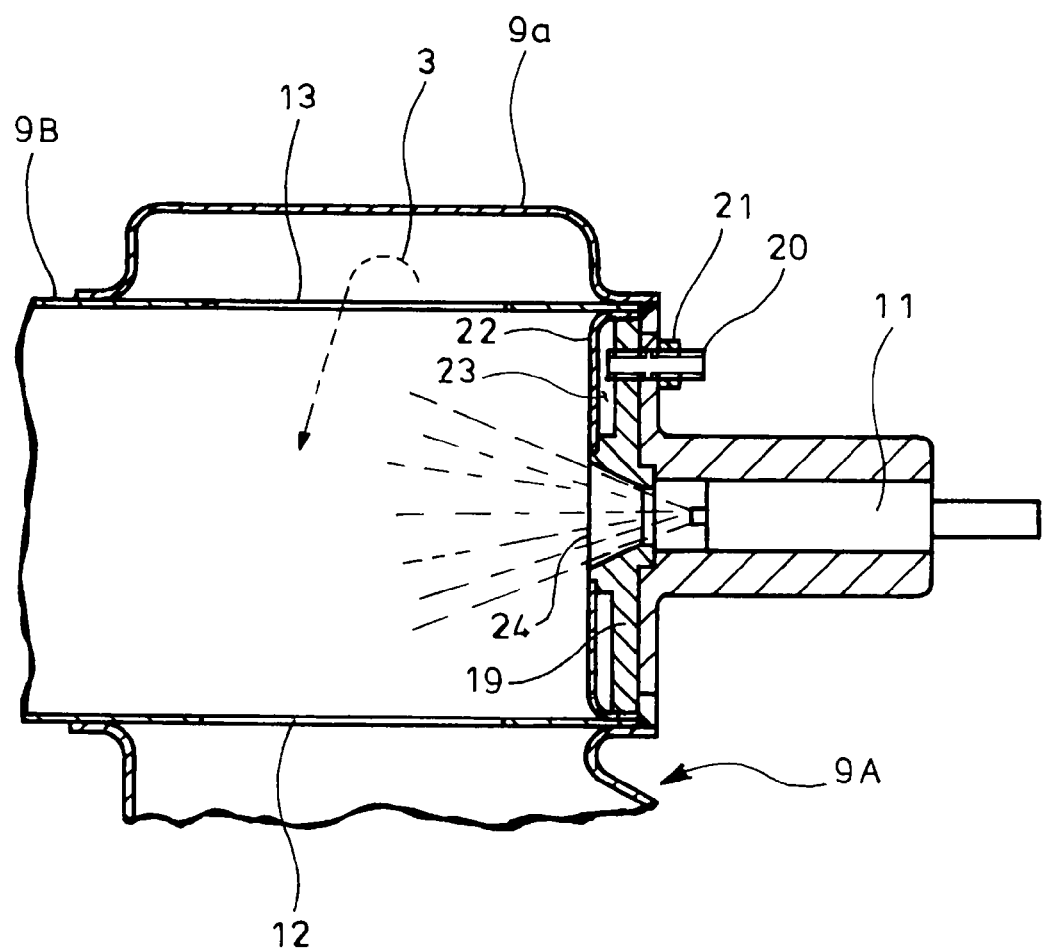
FIG. 6 is a sectional view showing an embodiment of the invention.

FIG. 6 shows the embodiment of the invention which has a structure substantially similar to that shown in FIGS. 4 and 5, a downstream end 9a of a gas gathering chamber 9A being connected to an entry-side end of a mixing pipe 9B (exhaust passage), an injector 11 for urea water addition being fitted axially of the entry-side end of the mixing pipe 9B.

A disc-like adapter 19 is fitted into the opening edge of the entry-side end of the mixing pipe 9B, so that the opening edge of the entry-side end of the mixing pipe 9B is closed by the adapter 19. The injector 11 is fastened to an outer surface of the adapter 19 by means of a stud bolt 20 and a nut 21 (fastening parts).

An inner surface of the adapter 19 to be exposed to the exhaust gas 3 is shielded by a heat-resisting plate 22 so that a space only including air is interposed between the plate 22 and the inner surface as heat insulating layer 23 (alternatively, heat-insulating material such as glass wool may be charged into the heat insulating layer 23).

Specifically, in the embodiment illustrated, the adapter 19 is axially formed with a lead-in opening 24 which guides urea water injected through the injector 11 into the mixing pipe 9B, a portion of the inner surface of the adapter 19 surrounding the lead-in opening 24 is raised to provide a step against its periphery, the step being utilized to provide a heat insulating layer 23 between the plate 22 and the inner surface of the adapter 19.

An outer periphery of the plate 22 extends over an outer periphery of the adapter 19 to an outer side surface of the adapter 19 where it is fixed in welding to the entry-side end of the mixing pipe 9B throughout the periphery so as to keep air-tightness.

Thus, with such construction, the inner surface of the adapter 19 to be exposed to the flow of the exhaust gas 3 is shielded by the heat-resisting plate 22 and moreover heat transfer from the adapter 19 to the injector 11 is significantly suppressed by the heat insulating layer 23 interposed between the plate 22 and the inner surface of the adapter 19, so that the injector 11 is prevented from being damaged due to overheat.

Furthermore, the fastening parts in the form of the stud bolt 20 and nut 21 for the adapter 19 and injector 11 are air-tightly shielded by the plate 22, so that heat transfer to the fastening parts for the adapter 19 and injector 11 is also suppressed and moreover the plate 22 also serves as gas seal for the fastening parts.

Thus, according to the above-mentioned embodiment, the inner surface of the adapter 19 to be exposed to the flow of the exhaust gas 3 is shielded by the heat-resisting plate 22 and the heat insulating layer 23 is interposed between the plate 22 and the inner surface, so that heat transfer from the adapter 19 to the injector 11 can be significantly suppressed and the injector 11 can be prevented from being damaged due to overheat, so that reliability of the injector 11 can be satisfactorily ensured for a long time.

Moreover, heat transfer to the fastening parts in the form of the stud bolt 20 and nut 21 for the adapter 19 and injector 11 can be suppressed and the plate 22 can also serve as gas seal for the fastening parts, so that the fastening parts are protected against heat of the exhaust gas 3 and corrosive components. As a result, the stud bolt 20 and nut 21 can be prevented from being damaged due to seizure, high-temperature oxidation and the like.

It is to be understood that an injector mounting structure according to the invention is not limited to the above-mentioned embodiment and that various changes and modifications may be made without departing from the scope of the invention. For example, the invention is not always limited to the connection of particulate filter and selective reduction catalyst arranged in parallel with each other through the S-shaped communication passage. The urea water added position and its peripheral construction are not limited to those in the embodiment illustrated. The fastening parts are not always a combination of stud bolt and nut.

The invention claimed is:

1. An injector mounting structure for an injector incorporated in an exhaust gas passage so as to add urea water to exhaust gas, the mounting structure comprising:
    a mixing pipe having a plurality of openings at an entry-side end of the mixing pipe;
    a plurality of partitions arranged at a rear end of the mixing pipe so as to guide the exhaust gas into a swirling flow around the rear end of the mixing pipe such that the exhaust gas is guided tangentially through the plurality of openings;
    a disk-like adapter fitted into an opening edge of the entry-side end of the mixing pipe so that the opening edge of the entry-side end of the mixing pipe is closed by the adapter;
    one or more securing devices that fasten the adapter to the injector so that the injector is fitted through the adapter at the entry-side of the mixing pipe and is oriented substantially along a longitudinal axis of the mixing pipe;
    a heat-resisting plate; and
    a heat insulating layer provided between at least a portion of the adapter and the heat-resisting plate,
    wherein an inner surface of said adapter to be exposed to an exhaust gas flow is shielded by the heat-resisting plate and the heat insulating layer provided between said heat-resisting plate and said inner surface of the adapter,
    wherein the one or more securing devices that fasten the adapter and the injector together are covered by the heat-resisting plate.

2. The injector mounting structure as claimed in claim 1, wherein the one or more securing devices for fastening the adapter and the injector together are air-tightly shielded by the plate.

3. The injector mounting structure as claimed in claim 2, wherein an outer periphery of the heat-resisting plate extends over an outer periphery of the adapter to an outer side surface of the adapter.

4. The injector mounting structure as claimed in claim 1, wherein the inner surface of the adapter is non-planar to thereby form a gap between a portion of the adapter and the heat-resisting plate.

5. The injector mounting structure as claimed in claim 4, wherein the gap is filled only with air and forms the heat insulating layer.

6. The injector mounting structure as claimed in claim 5, wherein the gap is provided along an outer peripheral portion of the inner surface of the adapter.

7. The injector mounting structure as claimed in claim 6, wherein one or more of the securing devices fasten the injector to the adapter at the outer peripheral portion.

8. The injector mounting structure as claimed in claim 1, wherein the urea water is added to where the swirling flow is formed.

9. The injector mounting structure as claimed in claim 1, wherein the plurality of partitions contact an outer surface of the rear end of the mixing pipe.

10. The injector mounting structure as claimed in claim 9, wherein a first opening of the plurality of openings includes a first partition adjacent a first edge of the opening, and a second partition provided adjacent a second edge of the opening opposite the first edge.

11. The injector mounting structure as claimed in claim 10, wherein a second opening of the plurality of openings includes only a single partition provided adjacent an edge of the second opening.

* * * * *